United States Patent
Yasui (10) Patent No.: US 6,805,948 B2
(45) Date of Patent: Oct. 19, 2004

(54) FLEXBEAM (75) Inventor: Shugo Yasui, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/726,712

(22) Filed: Dec. 3, 2003

(65) Prior Publication Data

US 2004/0146403 A1 Jul. 29, 2004

(30) Foreign Application Priority Data

Dec. 3, 2002 (JP) ........................................ 2002-351595

(51) Int. Cl.$^7$ ............................................... B32B 27/12
(52) U.S. Cl. ................. 428/301.4; 428/364; 428/297.4; 428/298.1; 428/299.4; 428/332; 416/134; 416/136; 416/140; 416/230; 416/226
(58) Field of Search .............................. 428/297.4, 332, 428/298.1, 299.4, 364, 301.4; 416/134, 136, 140, 230, 226

(56) References Cited

U.S. PATENT DOCUMENTS

| | | | |
|---|---|---|---|
| 4,648,800 A | * | 3/1987 | Fradenburgh et al. .. 416/134 A |
| 4,738,999 A | * | 4/1988 | Blenner et al. ................ 524/80 |
| 5,358,381 A | | 10/1994 | Covington et al. |
| 6,739,834 B2 | * | 5/2004 | Mochida et al. ........ 416/134 A |

FOREIGN PATENT DOCUMENTS

| | | |
|---|---|---|
| EP | 0 323 857 A2 A3 | 7/1989 |
| JP | 10-287297 | 10/1998 |

* cited by examiner

Primary Examiner—Merrick Dixon
(74) Attorney, Agent, or Firm—Smith, Gambrell & Russell, LLP (57) ABSTRACT

A flexbeam (1) having flapping portions (3) and lead-lag and feathering portions (5). Each lead-lag and feathering portion has: a central portion with an elongated and narrow width; middle portions each of which continuously connects to the central portion and branches from both ends of the central portion extending along the longitudinal direction thereof, and extends upward and downward; and edge portions each of which continuously connects to the middle portion and bends from each end of the middle portions and extends almost in parallel with the central portion. At corners formed on branch portions (40, 50) and/or bending portions (60, 70), concaves (41–43, 51–53, 61, 62, 71, 72) each of which has a cross-section of an approximate arc shape and which continuously and smoothly connects to two surfaces forming each of the corners and is formed inside extended planes of the two surfaces.

11 Claims, 5 Drawing Sheets

FLEXBEAM

BACKGROUND OF THE INVENTION

1. Field of the Invention

The present invention relates to a flexbeam for a helicopter and, more particularly, to a flexbeam of a hub structure provided with no bearing members.

2. Description of the Related Art

Blades of a helicopter are coupled with a rotor shaft through a hub so as to enable each of flapping motion, feathering motion and lead-lag motion. In order to enable these three motions on the blades, a hub structure with no bearing members, using an elastic (flexible) flexbeam has been recently proposed and put to practical use.

The flexbeam used in such a hub structure with no bearing members has flexible flapping portions, lead-lag portions and feathering portions. The three motions on the blade are achieved by deflection of the flapping portions and of the lead-lag portions, and torsion of the feathering portions.

There has been proposed such a conventional flexbeam in which the feathering portion has two substantially Y-shaped cross sections coupled to each other (refer, for example, to Patent document 1: Japanese Laid-Open Patent Publication No. Tokukai-hei 10-287297 (page 3 and FIG. 4)). The feathering portion of the flexbeam described in Patent document 1 includes a center member disposed at the center in a beam thickness direction, unidirectional members the center portions of which are disposed so as to get contact with upper and lower surfaces of the center member, and front edge portions and rear edge portions of which are formed and bent to be in parallel with the center portions, and laminated members disposed on the surfaces of the.

However, in the feathering portion of the flexbeam described in Patent document 1, since flat portions of the unidirectional member have a uniform plate thickness while the bending portions are partially thicker, the torsion rigidity at the bending portions still results in high. This causes concentration and increase of shear stress due to torsional deformation, and therefore there is plenty of scope for improvement of increasing beam strength. The high torsion rigidity of the flexbeam also requires a large control force for changing a blade pitch, which produces a load on a control system for changing the pitch. This load causes a problem of reducing the safety and reliability of the constructing parts for the control system.

The flexbeam described in Patent document 1 has the laminated members for reinforcement disposed on the bending portions of the unidirectional members in the feathering portions, however, this reinforcement still could not solve the reliability problem in the control system, caused by the high torsion rigidity.

SUMMARY OF THE INVENTION

An object of the invention is to provide a flexbeam in which reduction of torsion rigidity at feathering portions improves strength of the flexbeam by reducing shear stress due to torsional deformation.

Another object of the invention is to improve safety and reliability of a control system for changing a blade pitch.

In order to achieve the above-described object, in accordance with a first aspect of the invention, the flexbeam having flapping portions and lead-lag and feathering portions, in which each lead-lag and feathering portion comprises: a central portion having an approximate plate-like shape with an elongated and narrow width; middle portions each of which has an approximate plate-like shape and which continuously connects to the central portion and branches from both ends of the central portion extending along the longitudinal direction thereof, and extends upward and downward; and edge portions each of which has an approximate plate-like shape and which continuously connects to the middle portion and bends from each end of the middle portions and extends almost in parallel with the central portion, wherein at corners formed on at least one of branch portions and bending portions, concaves each of which has a cross-section of an approximate arc shape and which continuously and smoothly connects to two surfaces forming each of the corners and is formed inside extended planes of the two surfaces.

According to the first aspect of the invention, since the lead-lag and feathering portion has concaves each of which has a cross-section of an approximate arc shape and which continuously and smoothly connects to two surfaces forming each of the corners and is formed inside extended planes of the two surfaces, at corners formed on the branch portions between the central portion and the middle portion and/or at corners formed on the bending portions between the edge portions and the central portion, it is possible to reduce torsion rigidity of the feathering portions and thereby to moderate force concentration.

Accordingly, since the shear stress caused by torsional deformation is reduced, it is possible to thereby improve the beam strength. Reduction of the torsion rigidity in the lead-lag and feathering portion also reduces the control force for changing the blade pitch. As a result, this structure reduces the load on the control system for changing the pitch and improves the safety and reliability of components constructing the control system.

In accordance with a second aspect of the invention, the flexbeam having flapping portions and lead-lag and feathering portions, in which each lead-lag and feathering portion comprises: a first composite material extending in a beam length direction and having a plurality of fiber orientations; and second composite material extending in the beam length direction and having the fiber orientation in the same direction as the beam length direction, the first composite material and the second composite material being joined integrally, wherein the first composite material comprises: a center portion arranged at an approximate center in a beam thickness direction and extending in a beam width direction; first extending portions that extend in a beam front edge direction and a beam rear edge direction so as to branch from both ends of the center portion to beam upper and lower directions; and second extending portions that extend in the beam front edge direction and the beam rear edge direction so as to bend almost in parallel with the center portion at ends of the first extending portions, and the second composite material comprises: upper-and-lower portions arranged on upper and lower surfaces of the center portion, of the first extending portions and of the second extending portions, respectively; and front-and-rear edge portions arranged on beam front edge and rear edge side surfaces of the first extending portions and the second extending portions, wherein concaves are formed on at least one of branch portions formed by the center portion, the first extending portions, the upper-and-lower portions and the front-and rear edge portions, and at bending portions formed by the first extending portions, the second extending portions, the upper-and-lower portions and the front-and-rear edge portions.

According to the second aspect of the invention, since in each lead-lag and feathering portion, concaves are formed at branch portions formed by the center portion and the first extending portions, which are formed of the first composite materials, and the upper-and-lower portions and the front-and rear edge portions, which are formed of the second composite material, and/or at bending portions formed by the first extending portions and the second extending portions, which are formed of the first composite materials, and the upper-and-lower portions and the front-and-rear edge portions, which are formed of the second composite material, the torsion rigidity can be reduced and the force concentration can be moderated.

As a result, this structure reduces the load on the control system for changing the blade pitch, and improves the safety and reliability of components constructing the control system.

In the first or second aspect of the invention, preferably, the flexbeam further comprises a doubler made of composite material, for covering at least one of the concaves.

According to the flexbeam having such a structure, since the doublers reinforce the corners (branch portions and/or bending portions) the plate thickness of which is thinned by the concave, the beam strength can be improved against bending loads and torsional loads.

The doubler may be made of a sheet type of fiber reinforced composite material which is made from a prepreg obtained by impregnating a woven reinforced composite fiber material with a thermosetting resin.

Preferably, the portion having an approximate plate-like shape has a minimum cross-sectional thickness at the concave portion, which is in a range of 80–90% of a thickness at a flat region thereof. The reason for this is that excess depth of the concave reduces the strength of the lead-lag and feathering part, and insufficient depth of the concave does not reduce the torsion rigidity of the part.

In the second aspect of the invention, preferably, the first composite material is a glass fiber reinforced one which comprises one or more sheets of prepreg obtained by impregnating a woven glass fiber with a thermosetting resin, e.g., epoxy resin. The second composite material may be loop material in which glass fibers are extended in a direction and impregnated with a thermosetting resin, e.g., epoxy resin.

Preferably, the flexbeam further comprises a third composite material covering surfaces of the portions comprising the first and second composite material. The third composite material may be a glass fiber reinforced one which comprises one or more sheets of prepreg obtained by impregnating a woven glass fiber with thermosetting resin.

BRIEF DESCRIPTION OF THE DRAWINGS

The present invention will become more fully understood from the detailed description given hereinbelow and the accompanying drawings which are given by way of illustration only, and wherein.

DETAILED DESCRIPTION OF THE PREFERRED EMBODIMENTS

An embodiment of the invention will now be explained in detail with reference to the accompanying drawings.

Figure 1A:
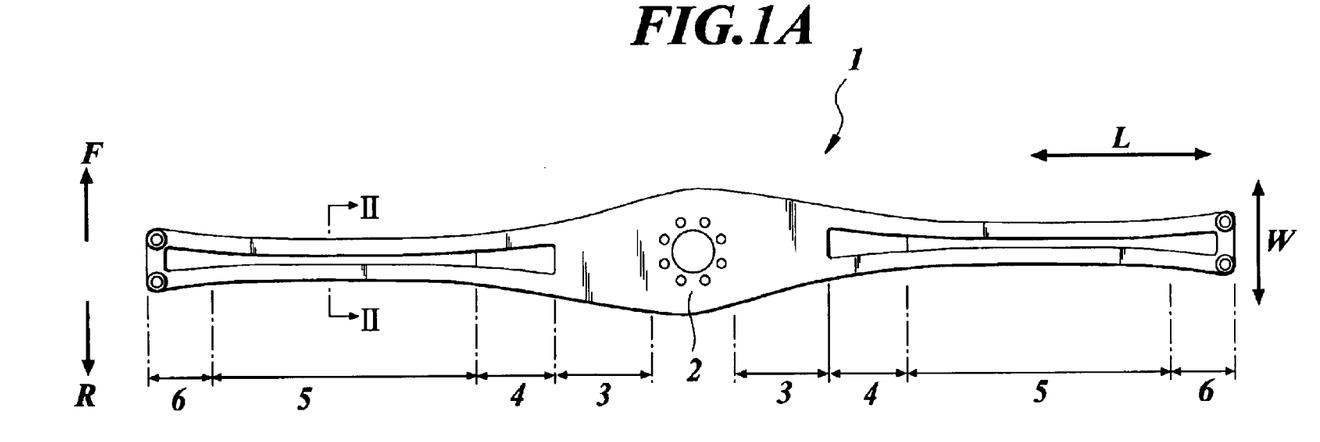
FIG. 1A is a plan view of a flexbeam according to an embodiment of the invention.
Figure 1B:
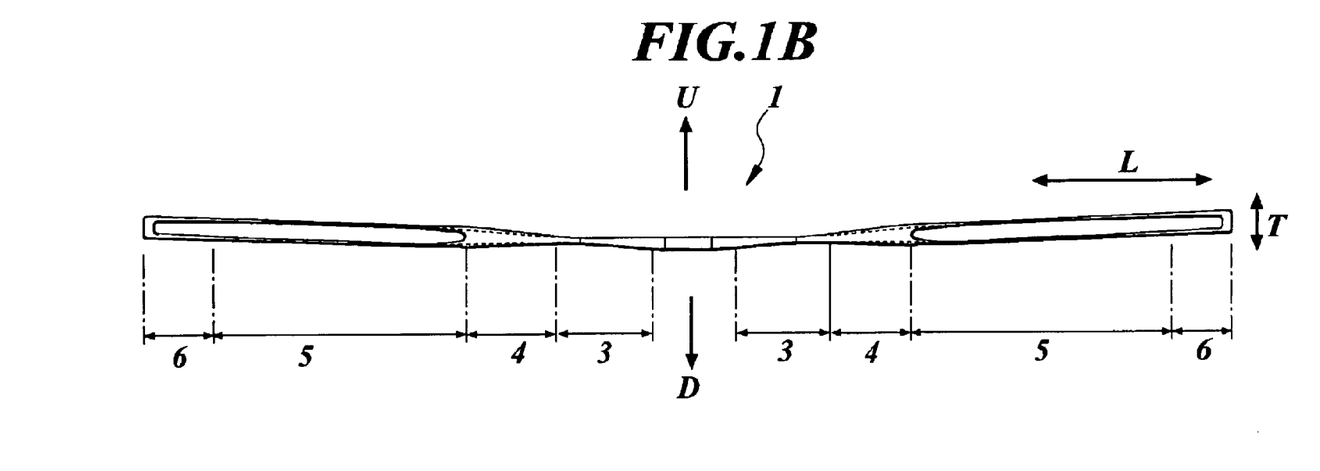
FIG. 1B is a side view thereof.

A flexbeam 1 according to an embodiment of the invention is a plate-like component with an elongated and narrow width, to construct a hub structure with no bearing members, of a helicopter, as shown in FIG. 1. Its elasticity (flexibility) realizes flapping motion, feathering motion and lead-lag motion of a blade.

Figure 2:
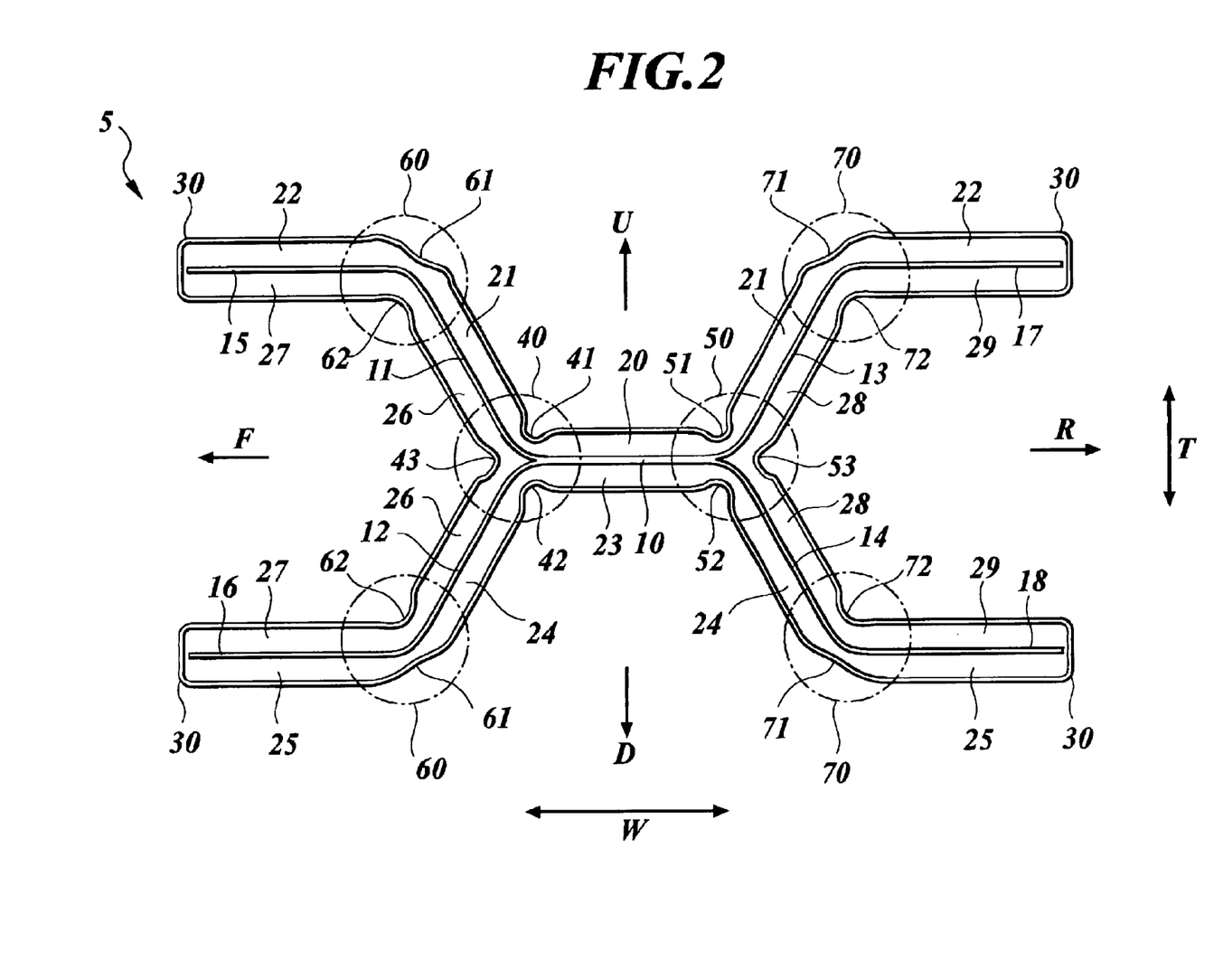
FIG. 2 is an enlarged cross-sectional view taken along line II—II (lead-lag and feathering portion) of FIG. 1A.

A general structure of the flexbeam 1 will be explained referring to FIGS. 1 and 2. FIG. 1 shows an outside appearance of the flexbeam 1; FIG. 1A is its plan view, and FIG. 1B is its side view. FIG. 2 is an enlarged cross-sectional view taken along line II—II of FIG. 1A.

Hereinafter, a "beam-length direction" means the direction indicated by an arrow L in FIG. 1, a "beam-width direction" means the direction by an arrow W in FIGS. 1 and 2, and a "beam-thickness direction" means the direction by an arrow T. A "beam-upper direction" means the direction indicated by an arrow U in FIGS. 1 and 2, a "beam-lower direction" means the direction by an arrow D, a "beam front edge direction" means the direction by an arrow F, and a "beam rear edge direction" means the direction by an arrow R.

The flexbeam 1 includes a shaft mounting portion 2, flapping elements 3, transit elements 4, lead-lag and torsion elements 5, and blade mounting portions 6.

The shaft mounting portion 2 is provided, as shown in FIG. 1, at the central portion of the flexbeam 1 in the beam-length direction to be mounted on a rotor shaft of the helicopter.

The flapping elements 3 are plate-like portions, each having a near rectangular cross-section in a direction perpendicular to the length direction, and provided in both sides of the mounting portion 2. The size in the beam-thickness direction (plate thickness) of the element 3 is, as shown in FIGS. 1A and 1B, smaller than that in the beam-width direction. The flexible structure in the upper-lower direction allows the flapping motion (bending motion in the upper-lower direction) of the blade. The flapping elements 3 correspond to flapping portions in the invention.

The lead-lag and torsion element 5 has, as shown in FIG. 1, a smaller size in the width direction than that of the flapping element 3 to adjust the rigidity, which permits the lead-lag motion (bending motion in a front-rear edge direction) of the blade.

The lead-lag and torsion element 5 has two approximate Y shapes connected to each other (an approximate X shape: see FIG. 2) as a cross-section shape in a direction perpendicular to the beam-length direction without connection between their farthest edges for adjustment of torsion rigidity, which permits the feathering motion, that is, torsional motion around the center in the beam-length direction. The lead-lag and torsion elements 5 correspond to lead-lag and feathering portions in the invention.

The transit element 4 connects the flapping element 3 and the lead-lag element 5. The blade mounting portions 6 are for being coupled with rotor blades of the helicopter, and are located, as shown in FIG. 1, at both ends in the beam-length direction of the flexbeam 1.

The structure of the lead-lag and torsion element (lead-lag and feathering portion) 5 which is a main portion of the invention, will now be explained in detail with reference to FIG. 2 through FIG. 4C.

The lead-lag and torsion element 5 is constructed by integrally joining a first composite material extending in the length direction and having a plurality of fiber orientations, second composite material extending in the length direction and having the fiber orientation in the same direction as the extending direction, and a third composite material covering the surface of each portion comprising the first and second composite material.

The first composite material is a tape-like glass fiber reinforced composite material that is obtained by laminating one or more sheets of prepreg (pre-impregnation material) and hardening it, the prepreg impregnating glass fiber cloth with thermosetting resin. The first composite material is employed to form plural portions that will be explained later, that is, a center portion 10, a first front edge upper extending portion 11, a first front edge lower extending portion 12, a first rear edge upper extending portion 13, a first rear edge lower extending portion 14, a second front edge upper extending portion 15, a second front edge lower extending portion 16, a second rear edge upper extending portion 17, and a second rear edge lower extending portion 18.

The second composite material is loop material, whose glass fiber is extended in one direction and impregnated with thermosetting resin. The second composite material is employed to form plural portions that will be explained later, that is, a center upper portion 20, first front-rear edge upper portions 21, second front-rear edge upper portions 22, a center lower portion 23, first front-rear edge lower portions 24, second front-rear edge lower portions 25, first front edge portions 26, second front edge portions 27, first rear edge portions 28 and second rear edge portions 29.

Portions formed by the second composite material are separated from each other and prepared and formed by winding a continuous roving with use of a filament winding machine. In the embodiment, epoxy resin is employed as the thermosetting resin for the first and second composite material.

As shown in FIG. 2, the lead-lag and torsion element 5 has a center portion 10 disposed at the center in the thickness direction and extending in the width direction, a first front edge upper extending portion 11 and a first front edge lower extending portion 12, both extending toward the front edge direction of the beam so as to branch from the front edge side end of the center portion 10 to the upper and lower directions, respectively, and a first rear edge upper extending portion 13 and a first rear edge lower extending portion 14, both extending toward the rear edge direction of the beam so as to branch from the rear edge side end of the center portion 10 to the upper and lower directions, respectively. These extending portions 11, 12, 13 and 14 constitute first extending portions in the invention and are formed of the first composite material.

As shown in FIG. 2, the lead-lag and torsion element 5 has a second front edge upper extending portion 15 and a second front edge lower extending portion 16, which extend toward the front edge direction so as to bend almost in parallel with the center portion 10 at respective front edge side ends of the extending portions 11 and 12, and a second rear edge upper extending portion 17 and a second rear edge lower extending portion 18, which extend toward the rear edge direction so as to bend almost in parallel with the center portion 10 at respective rear edge side ends of the extending portions 13 and 14. These extending portions 15, 16, 17 and 18 constitute second extending portions in the invention and are formed of the first composite material.

The upper side of the center portion 10, extending portions 11, 13, 15 and 17 are formed by bending a sheet of first composite material and disposed at the upper side of the beam. Similarly, the lower side of the center portion 10, extending portions 12, 14, 16, and 18 are formed by bending a sheet of first composite material and disposed at the lower side of the beam.

As shown in FIG. 2, the lead-lag and torsion element 5 also has a center upper portion 20, first front-rear edge upper portions 21 and second front-rear edge upper portions 22, which are disposed on the beam upper side surfaces of the center portion 10, the first extending portions (portions 11, 13), and the second extending portions (portions 15, 17), respectively. Similarly, the element 5 has a center lower portion 23, first front-rear edge lower portions 24 and second front-rear edge lower portions 25, which are disposed on the beam lower side surfaces of the center portion 10, the first extending portions (portions 12, 14), and the second extending portions (portions 16, 18), respectively. The upper portions 20, 21 and 22 constitute an upper portion in the invention, and the lower portions 23, 24 and 25 constitute a lower portion in the invention. These upper-and-lower portions are formed by the second composite material.

As shown in FIG. 2, the lead-lag and torsion element 5 also has first front edge portions 26 and second front edge portions 27, which are disposed on the beam front edge side surfaces of the first extending portions (portions 11, 12) and the second extending portions (portions 15, 16), respectively. Similarly, the element 5 has first rear edge portions 28 and second rear edge portions 29, which are disposed on the beam rear edge side surfaces of the first extending portions (portions 13, 14) and the second extending portions (portions 17, 18), respectively. The front edge portions 26 and 27 constitute a front edge portion in the invention, and the rear edge portions 28 and 29 constitute a rear edge portion in the invention. These front and rear edge portions are formed by the second composite material.

As shown in FIG. 2, the lead-lag and torsion element 5 also has a covering portion 30 formed by the third composite material, which covers the surfaces of the portions 20, 21, 22, 23, 24, 25, 26, 27, 28, and 29. As the third composite material, there can be employed, as in the first composite material, tape-like glass fiber reinforced composite material that is obtained by hardening the prepreg impregnating the glass fiber cloth with the thermosetting resin.

The center portion 10 formed by the first composite material, the center upper portion 20 and lower portion 23 formed by the second composite material and the covering portion 30 formed by the third composite material, constitute a central portion (elongated and narrow-width near plate-like portion) in the invention. The extending portions 11, 12, 13 and 14 formed by the first composite materials, the portions 21, 24, 26 and 28 by the second composite material and the covering portion 30 by the third composite material, constitute middle portions in the invention. The middle portions are near plate-like portions continuing and branching from both ends extending along the longitudinal direction of the central portion and extending upward and downward. The extending portions 15, 16, 17 and 18 by the first composite materials, the portions 22, 25, 27 and 29 by the second composite material and the covering portion 30 by the third composite material, constitute edge portions in the invention. The edge portions are near plate-like portions continuing and bending from the respective ends of the middle portions, and extending almost in parallel with the central portion.

A front edge side branch portion 40 is constituted by the center portion 10, extending portions 11, 12, upper portions 20, 21, lower portions 23, 24, front edge portions 26 and covering portion 30. Similarly, a rear edge side branch portion 50 is constituted by the portions 10, 13, 14, 20, 21, 23, 24, 28 and 30. These branch portions 40 and 50 denote branch portions in the invention.

Front edge side bending portions 60 are constituted by the extending portions 11, 12, 15, 16, upper portions 21, 22, lower portions 24, 25, front edge portions 26, 27 and covering portion 30. Similarly, the portions 13, 14, 17, 18, 21, 22, 24, 25, 28, 29 and 30 constitute rear edge side bending portions 70. These bending portions 60 and 70 denote bending portions in the invention. The branch portions (branch portions 40 and 50) and bending portions (bending portions 60 and 70) represent corners in the invention.

The front edge side branch portion 40 has, as shown in FIG. 2, a front edge upper concave 41 at the beam upper side, a front edge lower concave 42 at the beam lower side, and a front side concave 43 at the beam front edge side. The rear edge side branch portion 50 has a rear edge upper concave 51 at the beam upper side, a rear edge lower concave 52 at the beam lower side, and a rear side concave 53 at the beam rear edge side.

Each of the front edge side bending portions 60 has, as shown in FIG. 2, a front edge outer concave 61 at the beam upper or lower side, and a front edge inward concave 62 at the beam front edge side. Similarly, each of the rear edge side bending portions 70 has a trail edge outer concave 71 at the beam upper or lower side, and a rear edge inward concave 72 at the beam rear edge side.

The front edge side concaves 41, 42, 43, 61 and 62, rear edge side concaves 51, 52, 53, 71 and 72 represent concaves in the invention. These concaves effectively reduce the torsion rigidity of the lead-lag and torsion element 5.

The minimum cross-sectional thickness of the plate-like portion at the concave portion is preferably set to 80–90% of the plate thickness at the flat portion having the concave. Excess depth of the concave reduces the strength of the lead-lag and torsion element 5, and insufficient depth of the concave does not reduce the torsion rigidity of the element 5.

A description will now be given of the shapes of concaves provided at the branch portions and bending portions on the element 5 and of molding jigs for forming the concaves referring to FIG. 3. Here, the shapes of concaves provided at the front edge side branch portion 50 and bending portions 70 and the molding jigs therefor only will be described, and the description of substantially similar ones for the front edge side portions 40 and 60 will be omitted.

The rear edge lower concave 52 is so shaped as not to hinder a lower molding jig 200, which will be explained later, from being taken out to the beam-downward direction. In other words, the cross-section of the concave 52 has an approximate arc shape smoothly to continuously connect to two surfaces forming the branch portion 50, and the concave is formed toward inside of extended planes P1 and P2 of the two surfaces. The rear edge outer concave 71 also has, as in the concave 52, a shape so that it does not hinder the jig 200 from being taken out downward. Similarly, the rear edge upper concave 51 and the rear edge outer concave 71 are so shaped as not to hinder an upper molding jig 100, which will be explained later, from being taken out to beam upward direction.

The rear edge inward concave 72 is so shaped as not to prevent a side molding jig 300, which will be explained later, from being taken out to the beam rear edge direction. The rear side concave 53 also has, as in the concave 72, a shape so that it does not prevent the jig 300 from being taken out to the beam rear edge direction.

Figure 3:
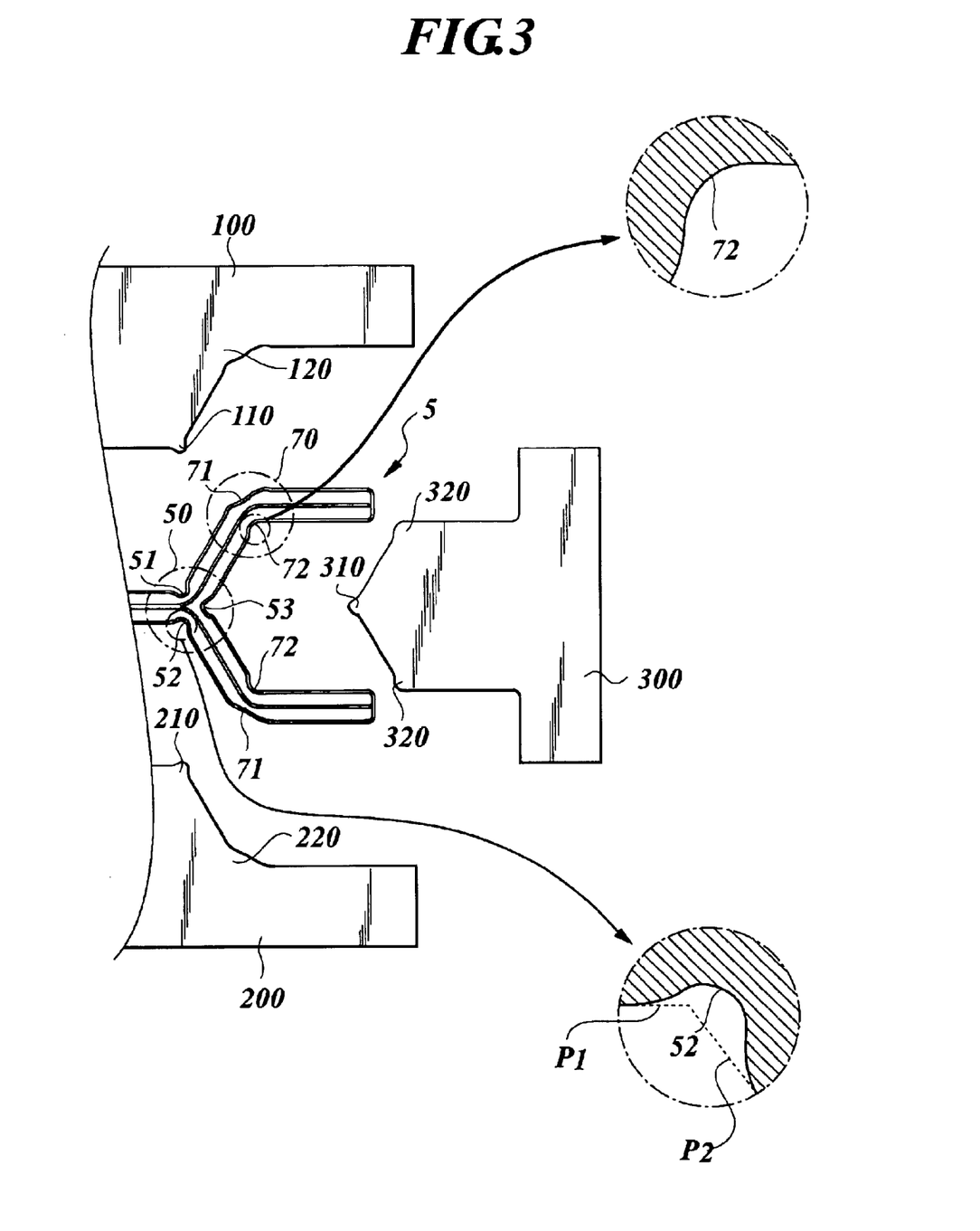
FIG. 3 is an explanation view for explaining the shapes of concaves provided on a branch portion and bending portions of a lead-lag and torsion element of the flexbeam shown in FIG. 1 and for explaining molding jigs for forming the concaves.

The lead-lag and torsion element 5 is, as shown in FIG. 3, molded by using the upper molding jig 100 arranged at the beam upper side, the lower molding jig 200 arranged at the beam lower side, and the side molding jigs 300 arranged at the beam front and rear edge sides. These molding jigs have necessary convex portions on respective conventional jigs.

The upper molding jig 100 has a first convex 110 for forming the concave 51, and a second convex 120 for forming the concave 71. The lower molding jig 200 has a first convex 210 for forming the concave 52, and a second convex 220 for forming the concave 71. The side molding jig 300 has a first convex 310 for molding the concave 53, and second convexes 320 for forming the concaves 72.

Figure 4A:
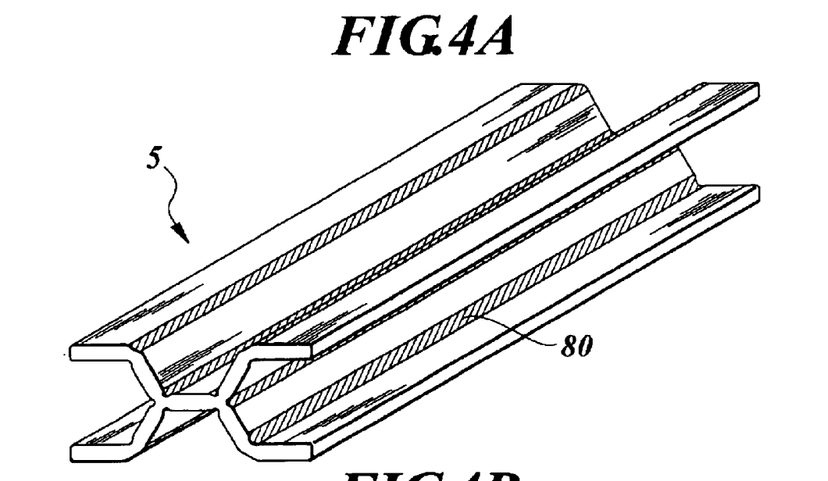
FIG. 4A is a schematic perspective view showing the lead-lag and torsion element of the flexbeam shown in FIG. 1, in which the concaves formed thereon are covered with doublers.
Figure 4B:
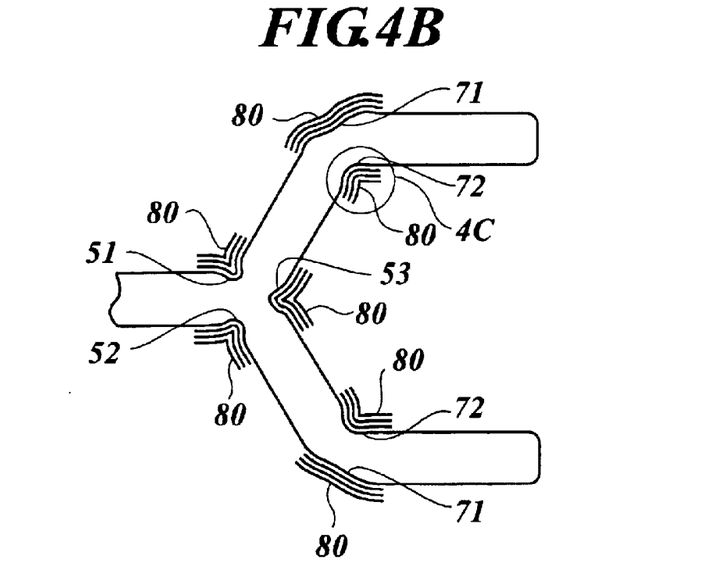
FIG. 4B is a schematic view showing the concaves with the doublers disposed thereon, provided at a beam rear edge side of the lead-lag and torsion element of the flexbeam shown in FIG. 4A.
Figure 4C:
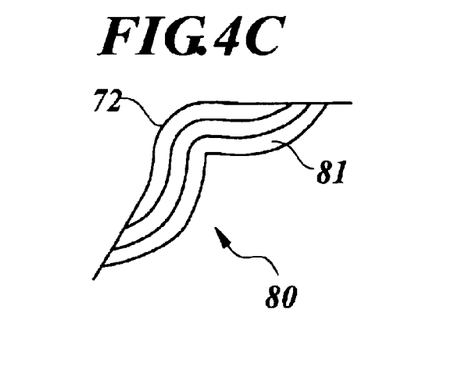
FIG. 4C is an enlarged view of an encircled portion 4C of FIG. 4B.

Each concave surface provided on the lead-lag and torsion element 5 is affixed with a doubler 80 for reinforcement. FIG. 4A is a schematic perspective view showing the lead-lag and torsion element 5 the concaves of which are covered with respective doublers 80 (hatched portions). FIG. 4B is an illustration showing the concaves with the doublers affixed thereon provided at the beam rear edge side of the element 5. FIG. 4C is an enlarged view of an encircled portion 4C in FIG. 4B.

The doubler 80 is a member made of composite material, covering and reinforcing each concave on the surface of the lead-lag and torsion element 5. As the doubler 80, there can be employed a sheet type fiber reinforced composite material made from a prepreg impregnating a woven reinforced composite fiber material with a thermosetting resin.

In the embodiment, the doubler 80 comprises laminated plural sheets of fiber-reinforced composite members 81, as shown in FIG. 4C. The doublers 80 can reinforce the branch portions and bending portions whose plate thickness is reduced by the concaves, to thereby improve the strength of the beam against bending loads and torsional loads. It is preferable to set the minimum cross-section thickness of the branch portions and the bending portions with the doublers 80 affixed on the concaves to within 80% of thickness of the flat portion.

Figure 5:
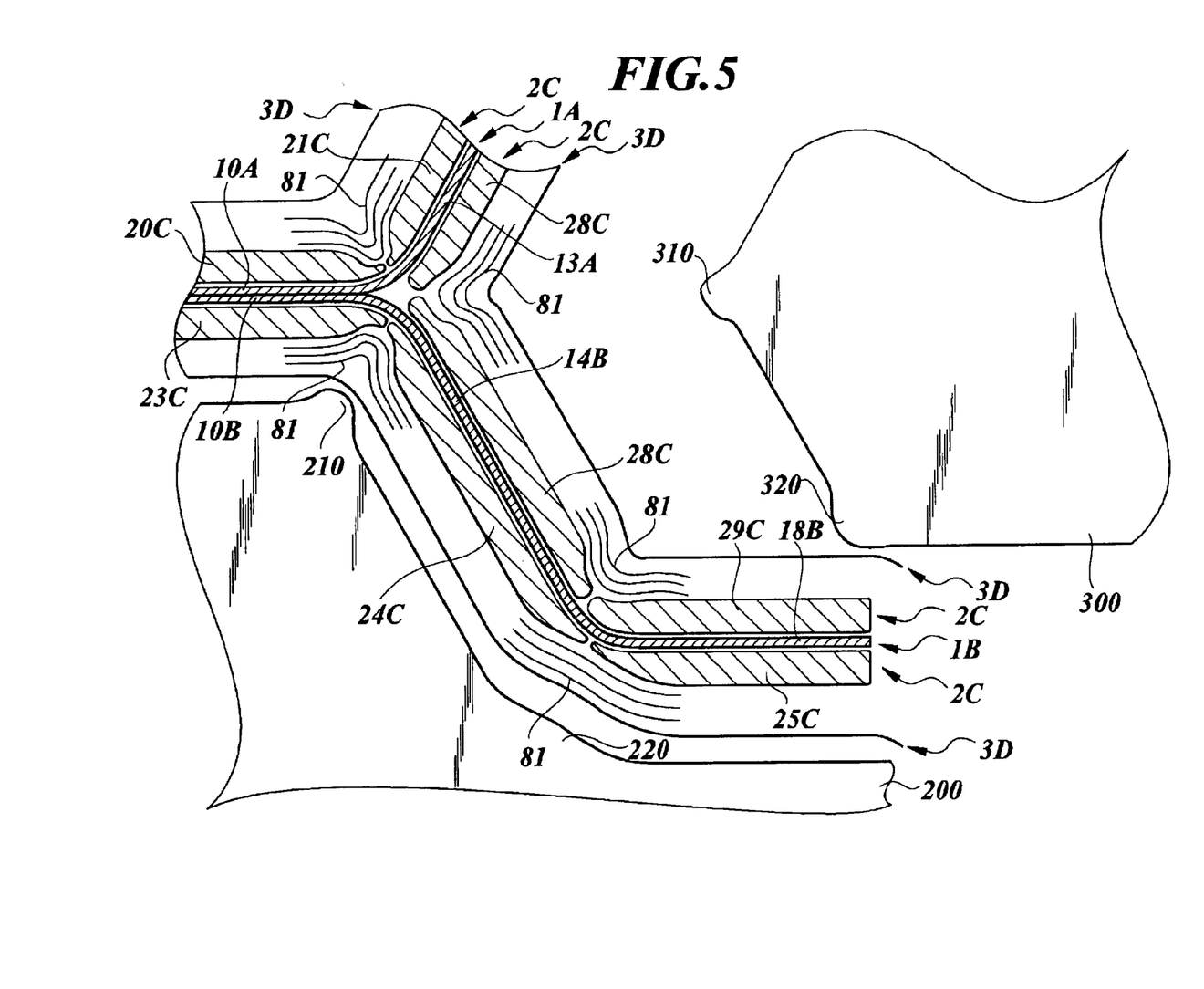
FIG. 5 is an explanation view for illustrating an arrangement of composite members and molding jigs when molding the beam rear edge side of the lead-lag and torsion element of the flexbeam shown in FIG. 1.

A description will now be given of a molding method for the lead-lag and torsion element 5 referring to FIG. 5. FIG. 5 illustrates an arrangement of composite members and molding jigs at the time of molding the beam rear edge side of the element 5. The molding process for the beam rear edge portion only will be explained, but that for the front edge portion is substantially the same.

First, as shown in FIG. 5, two sheets of first composite materials 1A and 1B are arranged so that portions 10A and 10B to become the center portion 10 can be piled up. Then, the member 1A placed at the upper side is bent to form a portion 13A to become the first upper extending portion 13 and a portion to become the second upper extending portion 17 (not shown). Similarly, the member 1B arranged at the lower side is bent to form a portion 14B to become the first rear edge lower extending portion 14 and a portion 18B to become the second rear edge lower extending portion 18.

Next, over the portions 10A, 13A and the portion to become the portion 17 formed of the first composite material 1A, there are arranged, respectively, a portion 20C to become the center upper portion 20, a portion 21C to become the first upper portion 21 and a portion to become the second upper portion 22 (not shown), which are formed of the second composite material 2C.

Here, the portion 20C and the portion 21C of the second composite material 2C are shaped so as to form the rear edge upper concave 51 (refer to FIG. 5).

Similarly, under the portions 10B, 14B and 18B of the first composite material 1B, there are arranged, respectively, a portion 23C to become the center lower portion 23, a portion 24C to become the first lower portion 24 and a portion 25C to become the second lower portion 25, which are formed of the second composite material 2C.

Here, the portion 23C and the portion 24C are shaped so as to form the rear edge lower concave 52. The portion 24C and the portion 25C are also shaped so as to form the rear edge outer concave 71.

At the rear edge side of the portion 13A and the portion to become the extending portion 17 (not shown) of the first composite material 1A, there are arranged a portion 28C to become the first rear edge portion 28 and a portion to become the second rear edge portion 29, which are formed of the second composite material 2C. Similarly, at the rear edge side of the portions 14B and 18B of the first composite material 1B, there are arranged a portion 28C to become the first rear edge portion 28 and a portion 29C to become the second rear edge portion 29, which are formed of the second composite material 2C.

The portion 28C described above is shaped so as to form the rear edge side concave 53. The portions 28C and 29C are also shaped so as to form the rear edge inward concave 72.

Next, as shown in FIG. 5, sheet-type fiber reinforced composite members 81 are piled up for forming the doublers 80 on the surfaces of the second composite material 2C forming each concave of the rear edge concaves 51, 52, 53, 71 and 72. Thereafter, the third composite material 3D covers the surfaces of the second composite material 2C and the sheet-type fiber reinforced composite members 81.

Subsequently, the upper molding jig 100 (not shown) presses against the formed member, which comprises the composite members 1A, 1B, 2C, 81 and 3D, from the beam upper side, the lower molding jig 200 from the beam lower side, and the side molding jig 300 from the beam rear edge side to integrally join these composite members 1A, 1B, 2C, 81 and 3D, thereby molding up the lead-lag and torsion element 5 (beam rear edge portion).

In the flexbeam 1 according to the embodiment explained above, the lead-lag and torsion element 5 has concaves (front edge concaves 41, 42, 43, rear edge concaves 51, 52, 53, outer and inward concaves 61, 62, 71 and 72) on each of the branch portions (40 and 50) and bending portions (60 and 70). Further, the cross-section of each concave has a smoothly formed near arc shape. The structure can reduce the torsion rigidity of the element 5, and can moderate the force concentration.

Accordingly, the shear stress caused by torsional deformation is reduced, to thereby improve the beam strength. Reduction of the torsion rigidity of the element 5 can also reduce the control force for changing the blade pitch. As a result, this structure can reduce the load on the control system for changing the pitch, and can improve the safety and reliability of components constructing the control system.

The lead-lag and torsion element 5 in the embodiment has the doublers 80 of composite members arranged on each concave provided on the branch portions and the bending portions, thereby reinforcing the joined portions of the composite members at the branched portions and the bending portions, the plate thickness of each portion being thinned by the concave. This reinforcement increases the strength of the beam against bending loads and torsional loads.

For the flexbeam 1 of the embodiment, each concave on the branch portions and bending portions of the element 5 is easily formed with the use of molding jigs provided with necessary convex portions (molding jigs 100, 200 and 300) on respective conventional jigs (see FIG. 3). Therefore, manufacturing of new molding jigs is not necessitated, to thereby reduce the cost of manufacturing jigs.

Further, when forming the element 5, previously divided and shaped second composite material can be applied to plural portions, so that the second composite material can be arranged without unbalance when molding. Therefore, quality of molded goods can be stabilized.

The lead-lag and torsion element 5 of the flex beam 1 according to the embodiment described above is provided with concaves on all two branch portions and four bending portions. As alternatives, either of two branch portions may have concaves thereon, or one to three bending portions out of four portions may have concaves thereon. The concaves may be provided only on the beam-upper side (lower side) of each of the branch portions and bending portions, or only on the beam-front edge side (rear edge side) thereof. Further, in consideration of beam strength, the concaves may be provided on only either portions of the branch portions and the bending portions.

It is to be understood that the invention is not limited to the above-described embodiments, and that various changes and modifications may be made by those of ordinary skill in the art without departing from the spirit and scope of the appended claims.

The entire disclosure of Japanese Patent Application No. Tokugan 2002-351595 filed on Dec. 3, 2002 including specification, claims, drawings and summary are incorporated herein by reference in its entirety.

What is claimed is:

1. A flexbeam having flapping portions and lead-lag and feathering portions, each lead-lag and feathering portion comprising:

a central portion having an approximate plate-like shape with an elongated and narrow width;

middle portions each of which has an approximate plate-like shape and which continuously connects to the central portion and branches from both ends of the central portion extending along the longitudinal direction thereof, and extends upward and downward; and edge portions each of which has an approximate plate-like shape and which continuously connects to the middle portion and bends from each end of the middle portions and extends almost in parallel with the central portion, wherein at corners formed on at least one of branch portions and bending portions, concaves each of which has a cross-section of an approximate arc shape and which continuously and smoothly connects to two surfaces forming each of the corners and is formed inside extended planes of the two surfaces.

2. The flexbeam according to claim 1, further comprising a doubler made of composite material, for covering at least one of the concaves.

3. The flexbeam according to claim 2, wherein the doubler is made of a sheet type of fiber reinforced composite material which is made from a prepreg obtained by impregnating a woven reinforced composite fiber material with a thermosetting resin.

4. The flexbeam according to claim 1, wherein the portion having an approximate plate-like shape has a minimum cross-sectional thickness at the concave portion, which is in a range of 80–90% of a thickness at a flat region thereof.

5. A flexbeam having flapping portions and lead-lag and feathering portions, each lead-lag and feathering portion comprising:

a first composite material extending in a beam length direction and having a plurality of fiber orientations; and second composite material extending in the beam length direction and having the fiber orientation in the same direction as the beam length direction, the first composite material and the second composite material being joined integrally, wherein the first composite material comprises:

a center portion arranged at an approximate center in a beam thickness direction and extending in a beam width direction;

first extending portions that extend in a beam front edge direction and a beam rear edge direction so as to branch from both ends of the center portion to beam upper and lower directions; and second extending portions that extend in the beam front edge direction and the beam rear edge direction so as to bend almost in parallel with the center portion at ends of the first extending portions, and the second composite material comprises:

upper-and-lower portions arranged on upper and lower surfaces of the center portion, of the first extending portions and of the second extending portions, respectively; and front-and-rear edge portions arranged on beam front edge and rear edge side surfaces of the first extending portions and the second extending portions, wherein concaves are formed on at least one of branch portions formed by the center portion, the first extending portions, the upper-and-lower portions and the front-and rear edge portions, and bending portions formed by the first extending portions, the second extending portions, the upper-and-lower portions and the front-and-rear edge portions.

6. The flexbeam according to claim 5, further comprising a doubler made of composite material, for covering at least one of the concaves.

7. The flexbeam according to claim 6, wherein the doubler is made of a sheet type of fiber reinforced composite material which is made from a prepreg obtained by impregnating a woven reinforced composite fiber material with a thermosetting resin.

8. The flexbeam according to claim 5, wherein the first composite material is a glass fiber reinforced one which comprises one or more sheets of prepreg obtained by impregnating a woven glass fiber with a thermosetting resin.

9. The flexbeam according to claim 5, wherein the second composite material is loop material in which glass fibers are extended in a direction and impregnated with a thermosetting resin.

10. The flexbeam according to claim 5, further comprising a third composite material covering surfaces of the portions comprising the first and second composite material.

11. The flexbeam according to claim 10, wherein the third composite material is a glass fiber reinforced one which comprises one or more sheets of prepreg obtained by impregnating a woven glass fiber with thermosetting resin.

* * * * *